(12) United States Patent
Fukui

(10) Patent No.: US 10,458,173 B2
(45) Date of Patent: Oct. 29, 2019

(54) REAR DOOR OPEN/CLOSE SWITCH

(71) Applicant: TOYODA GOSEI CO., LTD., Kiyosu-shi (JP)

(72) Inventor: Hirotaka Fukui, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 15/994,635

(22) Filed: May 31, 2018

(65) Prior Publication Data

US 2019/0093411 A1    Mar. 28, 2019

(30) Foreign Application Priority Data

Sep. 26, 2017    (JP) .................................. 2017-185053

(51) Int. Cl.
    *H01H 13/20*    (2006.01)
    *E05F 15/63*    (2015.01)
    *E05B 81/76*    (2014.01)
    *E05F 1/14*     (2006.01)

(52) U.S. Cl.
    CPC .............. *E05F 15/63* (2015.01); *E05B 81/76* (2013.01); *E05F 1/14* (2013.01); *E05Y 2900/532* (2013.01)

(58) Field of Classification Search
    CPC .. H01H 2031/286; H01H 25/06; H01H 19/10; H01H 19/56; H01H 3/10; H01H 21/24; H01H 25/008; H01H 71/56; H01H 2221/01; H01H 3/08; H01H 21/22; H01H 3/04; H01H 3/38; H01H 21/02; H01H 3/46; H01H 1/44; E05B 81/76; E05B 85/10; E05B 83/40; E05B 85/12; E05B 77/30; E05F 15/63; E05F 2015/631; E05F 15/60; E05F 15/73
    See application file for complete search history.

(56) References Cited

U.S. PATENT DOCUMENTS

| 4,343,501 A * | 8/1982 | Meeks ..................... E05B 85/12 |
| | | 292/113 |
| 5,961,166 A * | 10/1999 | Edwards ................. E05B 85/12 |
| | | 292/336.3 |
| 6,349,450 B1 * | 2/2002 | Koops ................. E05B 17/0016 |
| | | 16/430 |

(Continued)

FOREIGN PATENT DOCUMENTS

JP    2007-001524 A    1/2007

*Primary Examiner* — Ahmed M Saeed

(74) *Attorney, Agent, or Firm* — McGinn IP Law Group, PLLC.

(57) ABSTRACT

A rear door open/close switch for being installed in a rear door of a vehicle. The switch includes an arm including an operating portion to be pressed when opening or closing the door, a switching portion that outputs a signal to open or lock the door, a spring member for pressing the arm in a rotational movement direction, and a housing that houses the arm, the switching portion and the spring member. The arm is arranged such that a rotational axis thereof is located nearer to a vehicle front side than the operating portion. When the arm is rotationally moved from an initial position to a switching position, an end portion of the spring member receives a force from a portion of the arm located nearer to the vehicle front side than the rotational axis and the spring member is elastically deformed by the force and thereby presses the arm.

6 Claims, 4 Drawing Sheets

(56) References Cited

U.S. PATENT DOCUMENTS

| | | | | |
|---|---|---|---|---|
| 7,244,897 | B2* | 7/2007 | Villagrasa | E05B 81/76 200/302.1 |
| 10,253,530 | B2* | 4/2019 | Savant | E05B 81/76 |
| 10,253,533 | B1* | 4/2019 | Pudney | E05B 81/06 |
| 2002/0046439 | A1* | 4/2002 | Agostini | E05B 81/76 16/110.1 |
| 2003/0000149 | A1* | 1/2003 | Oakley | E05B 47/023 49/449 |
| 2004/0262139 | A1* | 12/2004 | Ieda | E05B 81/76 200/341 |
| 2019/0003213 | A1* | 1/2019 | Yokomori | B60J 5/00 |
| 2019/0136588 | A1* | 5/2019 | Nagaoka | B60J 5/00 |

* cited by examiner

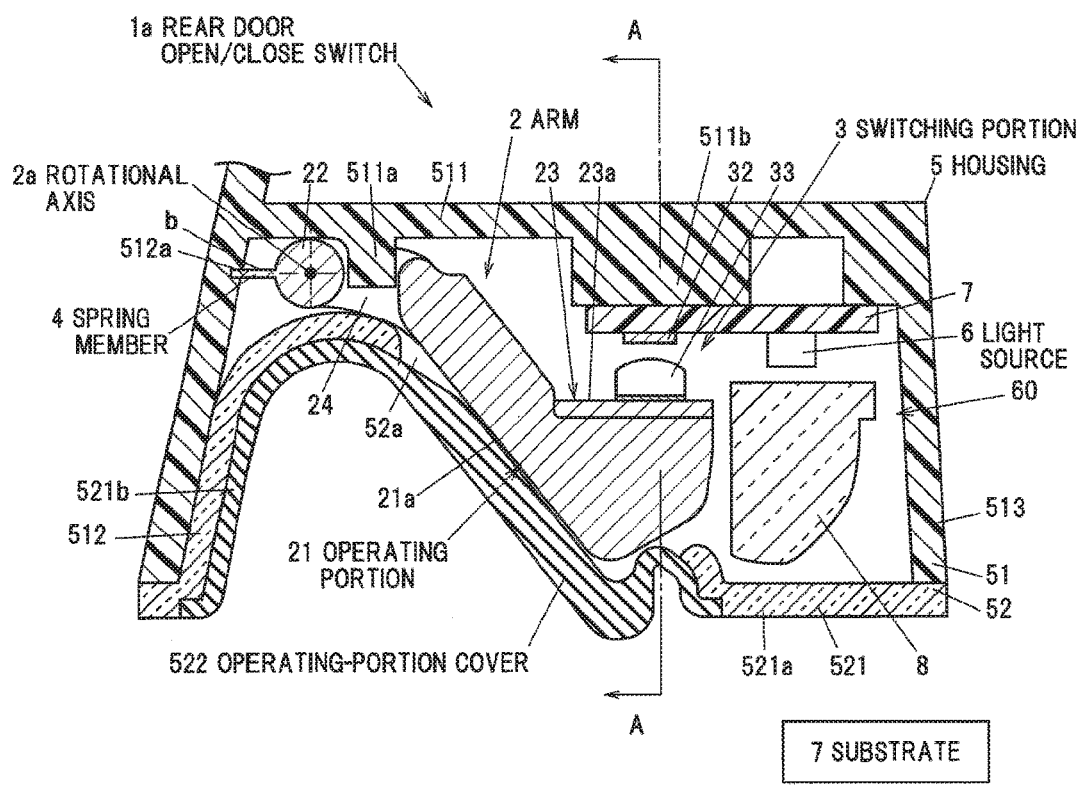
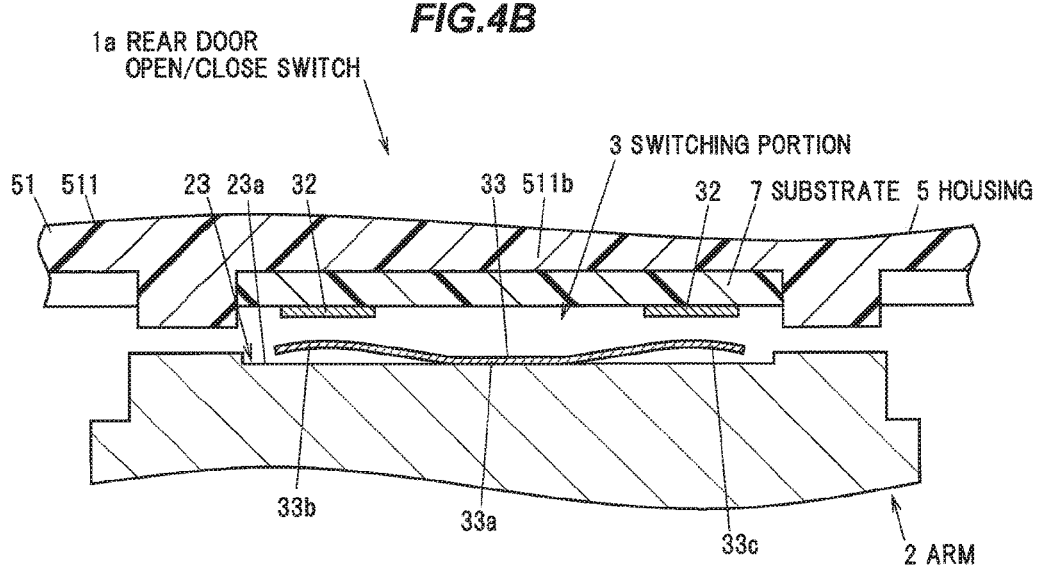

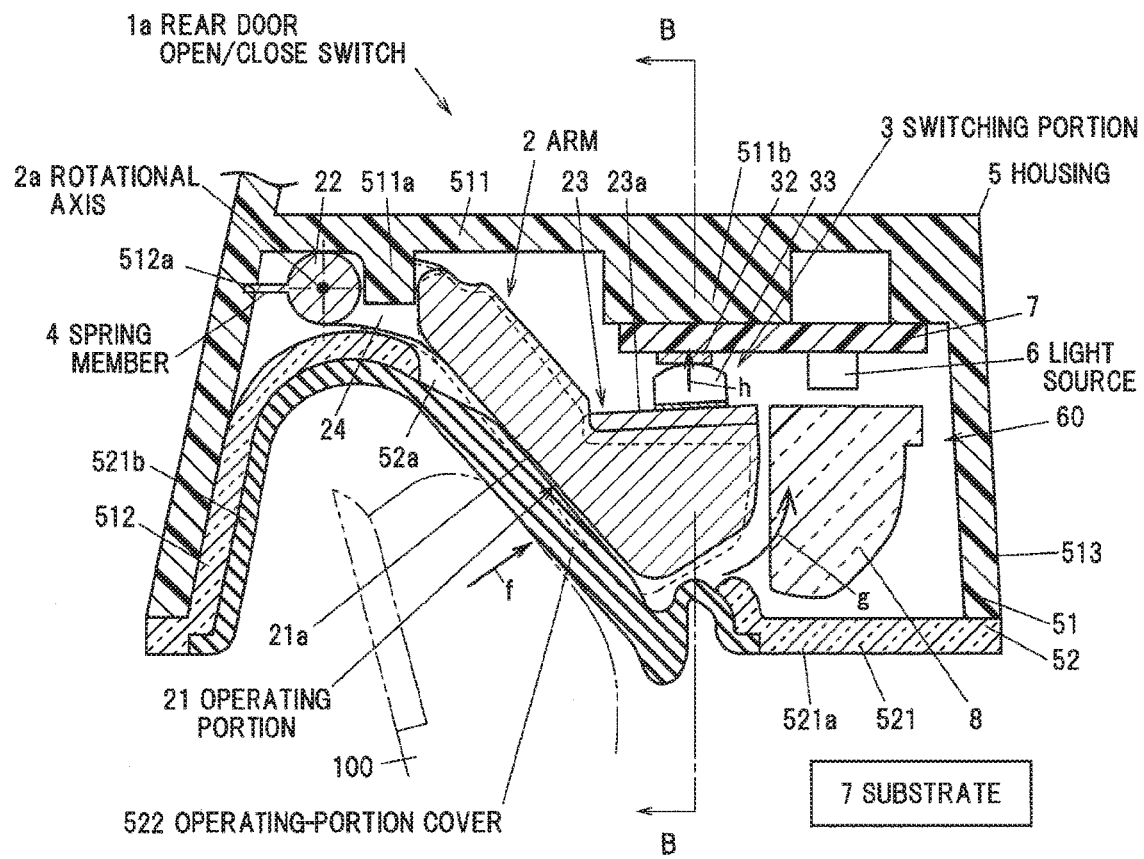
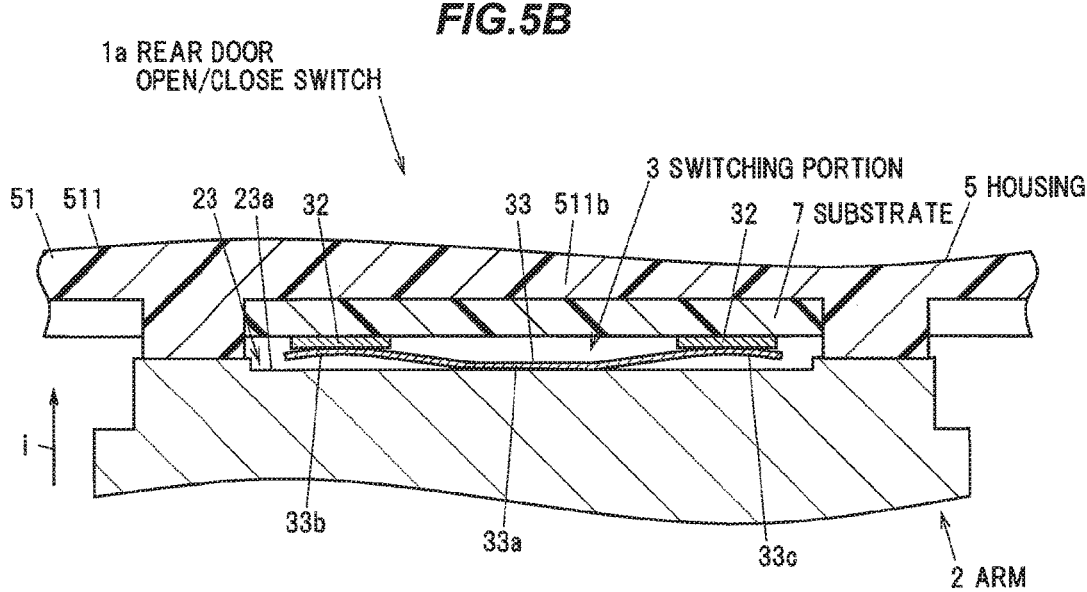

REAR DOOR OPEN/CLOSE SWITCH

The present application is based on Japanese patent application No. 2017-185053 filed on Sep. 26, 2017, the entire contents of which are incorporated herein by reference.

BACKGROUND OF INVENTION

1. Field of Invention

The invention relates to a rear door open/close switch. Herein, the word "rear door" means a rear door of a vehicle such as an automobile that swings upward to provide access to a cargo area thereof.

2. Related Art

A rear door (or a rear hatch, a tailgate) of a vehicle is equipped with, e.g., a rear door open/close switch to open and close the rear door, a license plate lamp (LPL) for illuminating a license plate, and a backup camera for giving an image behind the vehicle.

When a rear door open/close switch and a license plate lamp are provided separately, the occupied space and the number of components are increased and it takes time and effort for assembly. Thus, JP 2007/001524 A proposes to integrate a rear door open/close switch with a license plate lamp.

SUMMARY OF INVENTION

The rear door open/close switch is required to be small in size, to give an adequate operation load, and to have a long life. However, in case of, e.g., a push switch, the operation load decreases with decreasing the size of the switch. Therefore, when using a small switch, the operation load is too small and may not be adequate.

The operation load could be adjusted (increased) by separately adding a spring member such as plate spring. In this case, however, it is necessary to devise the configuration so as not to damage a member such as a housing supporting the spring member during the repeated use.

For example, when a rear door open/close switch and a license plate lamp are integrated as mentioned above, a small switch must be used and it is desired to adjust the operation load by separately adding a spring member. However, to pass light from a light source of the license plate lamp when integrating the rear door open/close switch with the license plate lamp, the switch and the lamp need to be joined to a non-transparent portion of a partially transparent housing by welding or bonding, etc., or the entire housing needs to be formed of a transparent member. In this case, the housing does not have sufficient strength due to having the joint portion or due to the material of the transparent member, resulting in that the housing may not be able to withstand the load repeatedly applied by the spring member and may get damaged. Thus, there is a demand for a highly reliable rear door open/close switch of which housing is prevented from being damaged for long time even when having such configuration.

It is an object of the invention to provide a rear door open/close switch that has an adequate operation load and a long service life while being downsized.

According to one embodiment of the invention, a rear door open/close switch defined by [1] to [6] below can be provided.

[1] A rear door open/close switch for being installed in a rear door of a vehicle to open or close the rear door, comprising:

an arm that comprises an operating portion to be pressed when opening or closing the door and rotationally moves about a rotational axis from an initial position to a switching position when the operating portion is pressed;

a switching portion that outputs a signal to open or lock the rear door when the arm is rotationally moved to the switching position;

a spring member for pressing the arm in a rotational movement direction from the switching position toward the initial position; and a housing that houses the arm, the switching portion and the spring member and comprises an operating-portion cover allowing the operating portion to be pressed from the outside, wherein the arm is arranged such that the rotational axis thereof is located nearer to a vehicle front side (or vehicle front end) than the operating portion, wherein the spring member comprises a rod-shaped or plate-shaped elastic member and is arranged such that one end portion thereof is locked to the housing, and wherein when the arm is rotationally moved from the initial position to the switching position, another end portion of the spring member receives a force from a portion of the arm located nearer to the vehicle front side than the rotational axis and the spring member is elastically deformed by the force and thereby presses the arm.

[2] The rear door open/close switch according to [1], wherein the spring member is integrally formed with the arm in such a manner that the other end of the spring member is coupled to the portion of the arm nearer to the vehicle front side than the rotational axis.

[3] The rear door open/close switch according to [2], wherein the spring member extends along a vehicle longitudinal direction in a state that the arm is located at the initial position.

[4] The rear door open/close switch according to any one of [1] to [3], wherein the switch is configured to be attached to a door handle provided above a license plate attaching portion of the rear door, wherein the switch further comprises:

a light source for illuminating a license plate attached to the license plate attaching portion; and a substrate that is housed in the housing and mounts the light source and at least a portion of the switching portion, and wherein at least a portion of the housing comprises a transparent member transmitting light from the light source.

[5] The rear door open/close switch according to [4], wherein the light source is mounted on the substrate nearer to a vehicle rear side (or vehicle rear end) than the switching portion.

[6] The rear door open/close switch according to any one of [1] to [5], wherein the switching portion comprises two contacts not rotationally moving with rotational movement of the arm and a short-circuiting terminal that is provided on the arm and comes into contact with the both contacts to cause short-circuit therebetween when the arm is moved to the switching position, and wherein the short-circuiting terminal comprises a spring terminal elastically coming into contact with the two contacts.

Effects of Invention

According to one embodiment of the invention, a rear door open/close switch can be provided that has an adequate operation load and a long service life while being downsized.

BRIEF DESCRIPTION OF DRAWINGS

Next, the present invention will be explained in more detail in conjunction with appended drawings, wherein:

FIGS. 4A and 4B are diagrams illustrating a rear door open/close switch in the second embodiment of the invention, wherein FIG. 4A is a cross sectional view and FIG. 4B shows another cross section taken along a line A-A in FIG. 4A; and FIGS. 5A and 5B are diagrams illustrating the rear door open/close switch of FIG. 4 when the arm is rotationally moved to the switching position, wherein FIG. 5A is a cross sectional view and FIG. 5B shows another cross section view taken along a line B-B in FIG. 5A.

DESCRIPTION OF EMBODIMENTS

First Embodiment

Embodiments of the invention will be described below in conjunction with the appended drawings. Firstly, the first embodiment of the invention will be described.

General Configuration of Rear Door Open/Close Switch 1

Figure 1:
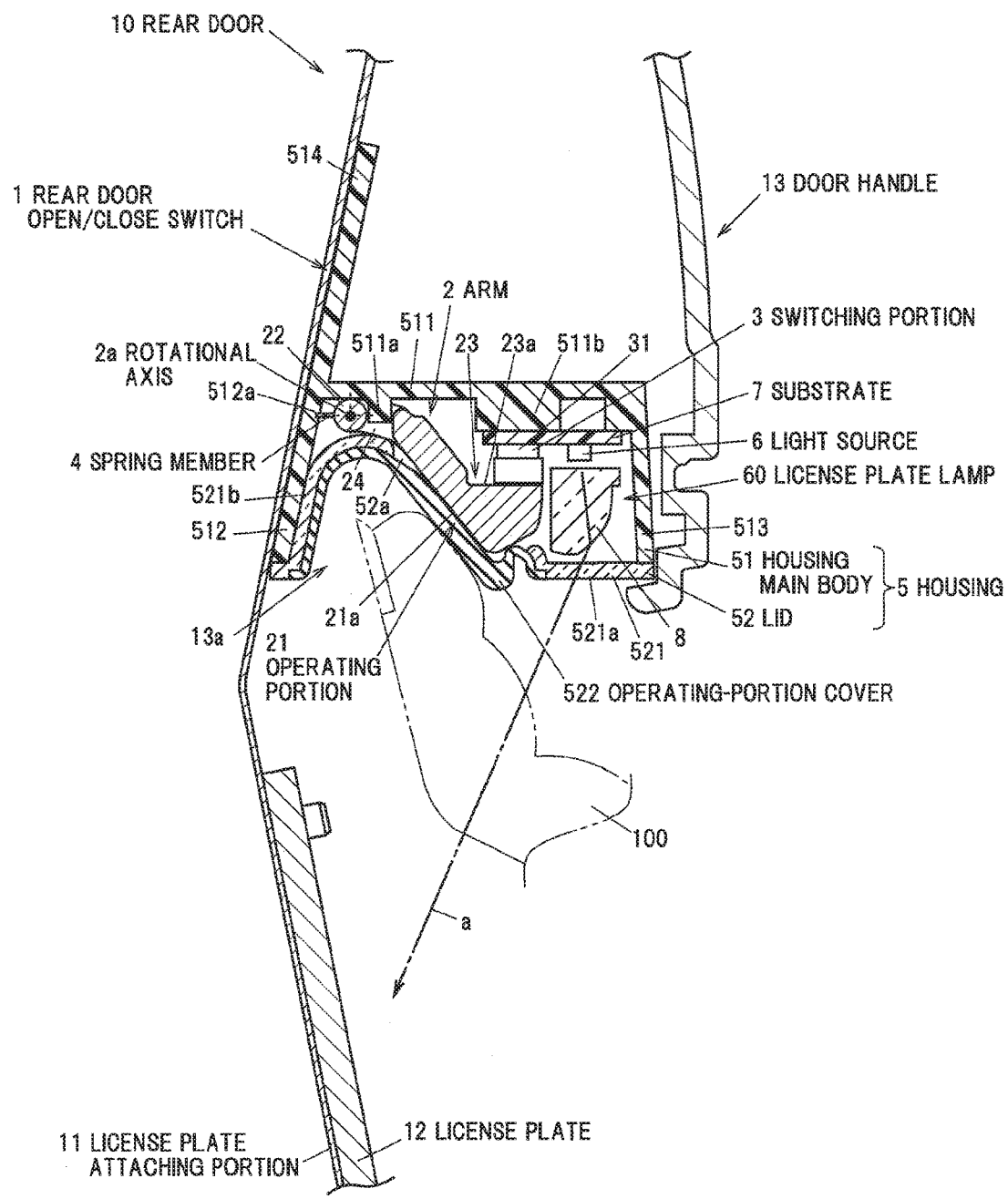
FIG. 1 is a cross sectional view showing a rear door on which a rear door open/close switch in the first embodiment of the present invention is provided.
Figure 2:
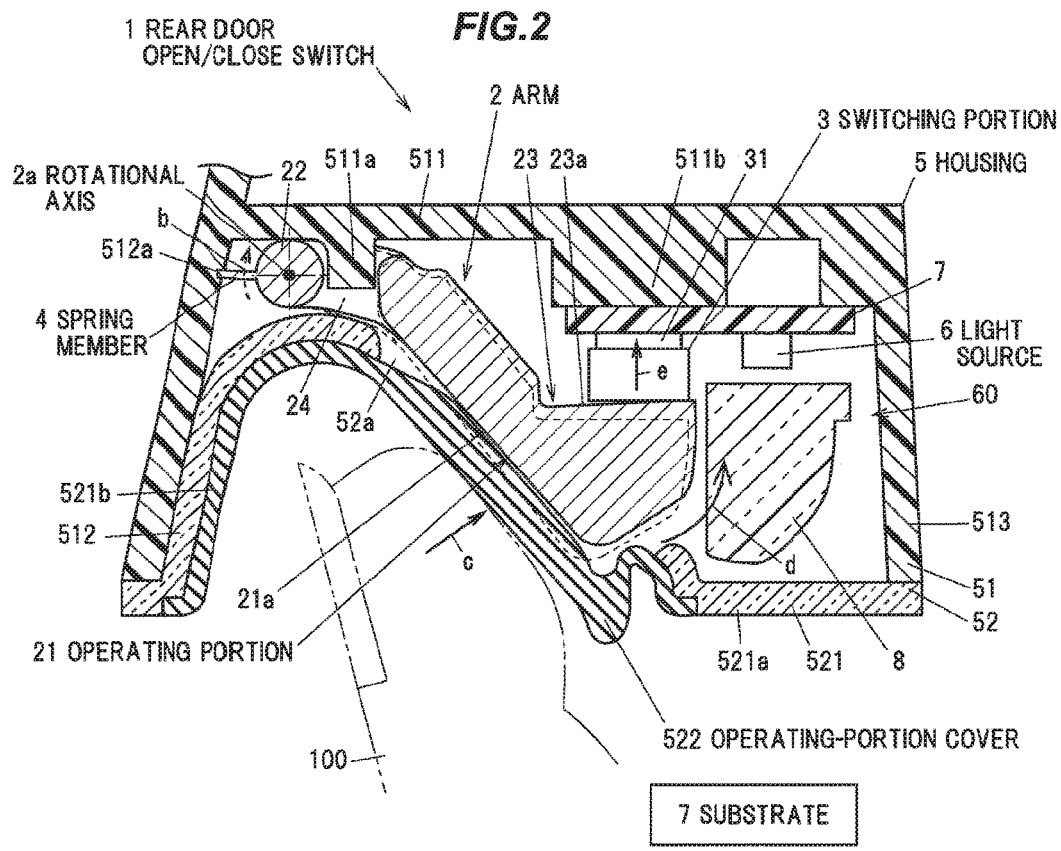
FIG. 2 is a cross sectional view showing the rear door open/close switch of FIG. 1 when an arm is rotationally moved to a switching position.
Figure 3:
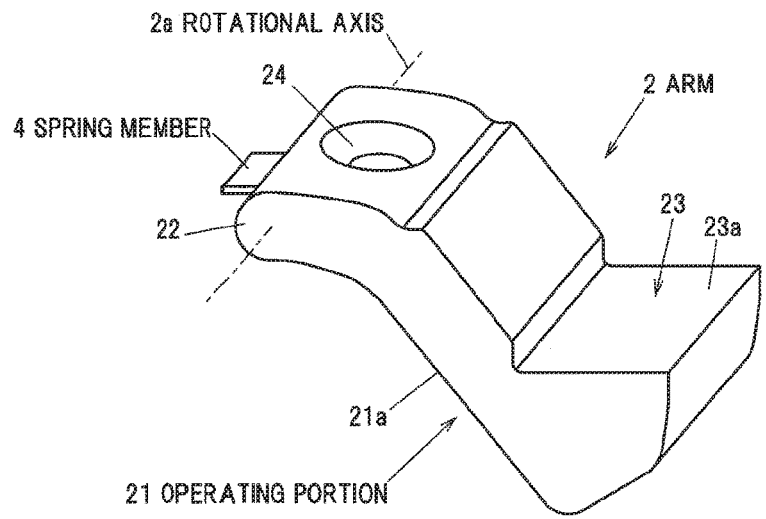
FIG. 3 is a perspective view showing the arm used in the rear door open/close switch of FIG. 1.

FIG. 1 is a cross sectional view showing a rear door 10 on which a rear door open/close switch 1 in the first embodiment of the invention is provided. FIG. 2 is a cross sectional view showing the rear door open/close switch 1 of FIG. 1 when an arm 2 is rotationally moved to a switching position. FIG. 3 is a perspective view showing the arm 2 used in the rear door open/close switch 1 of FIG. 1.

The rear door open/close switch 1 is provided on the rear door 10 of a vehicle to open and close the rear door 10 (or open and lock the rear door 10). The rear door 10 is a door also called rear hatch or tailgate and is provided on the rear of the vehicle.

The rear door 10 has a license plate attaching portion 11 to which a license plate 12 is attached. A door handle 13 as a handle portion (a handheld portion) for opening/closing the rear door 10 is provided on a portion of the rear door 10 above the license plate attaching portion 11 (a portion on the upper side in a vehicle vertical direction). The door handle 13 is provided to protrude toward the vehicle rear side relative to the license plate attaching portion 11.

The door handle 13 has an attachment hole 13a which opens on the vehicle lower side, and the rear door open/close switch 1 is attached to the attachment hole 13a. The rear door open/close switch 1 is a license plate lamp-integrated rear door open/close switch and has an integrated license plate lamp (LPL) 60 which illuminates the license plate 12 attached to the license plate attaching portion 11.

The rear door open/close switch 1 is provided with the arm (arm switch knob) 2, a switching portion 3, a spring member 4, a housing 5, a light source 6 and a substrate 7. Each member will be described in detail below.

Arm 2

The arm 2 has an operating portion 21 to be pressed when opening/closing the door, and rotationally moves about a rotational axis 2a from an initial position to a switching position when the operating portion 21 is pressed. In FIG. 1, the arm 2 is located at the initial position. In FIG. 2, the arm 2 is located at the switching position and the initial position is also indicated by a dashed line.

The arm 2 has an axis portion 22. The axis portion 22 has a substantially columnar shape having a center on the rotational axis 2a and is integrated with the operating portion 21. The operating portion 21 extends obliquely downward (in a direction inclined downward and rearward) from the axis portion 22. In addition, the operating portion 21 as a whole is curved and concave obliquely upward (in a direction inclined upward and rearward) when the arm 2 is located at the initial position. The surface on the inner side of the curve (the surface of the operating portion 21 on the lower side as well as the front side of the vehicle) is a press surface 21a to be pressed by a finger 100 of an operator.

The arm 2 is arranged such that the rotational axis 2a substantially coincides with a vehicle width direction. The arm 2 is also arranged such that the rotational axis 2a (the axis portion 22) is located nearer to the vehicle front side than the operating portion 21. The press surface 21a is inclined relative to a horizontal plane which is perpendicular to the vehicle vertical direction.

A through-hole 24 penetrating the arm 2 in the vehicle vertical direction is formed on the operating portion 21 at a portion in the vicinity of the axis portion 22. The arm 2 is positioned relative to the housing 5 (described later) by inserting a protrusion 511a of the housing 5 into the through-hole 24. Meanwhile, a switch operating portion 23 for operating the switching portion 3 is provided at an end portion of the operating portion 21 on the opposite side to the axis portion 22. The switch operating portion 23 will be described later.

Switching Portion 3

The switching portion 3 outputs a signal to open or lock the rear door 10 when the arm 2 is rotationally mover to the switching position. Although one arm 2 and one switching portion 3 are provided in this example, two pairs of the arm 2 and the switching portion 3 may be provided, such as one pair for opening the rear door 10 and one pair for locking the rear door 10.

The switching portion 3 used in the first embodiment is a push switch 31 in which internal contacts are electrically connected by being pressed. That is, in the first embodiment, the switching portion 3 outputs a contact signal (indicating whether or not the contacts are connected) as the signal to open or lock the rear door 10. However, it is not limited thereto as long as the switching portion 3 can output a signal when the arm 2 is located at the switching position. For example, a displacement sensor capable of detecting change of position of the arm 2 can be used as the switching portion 3.

The push switch 31, together with the light source 6, is mounted on the common substrate 7. The substrate 7 is arranged parallel to a horizontal plane perpendicular to the vehicle vertical direction, and the push switch 31 and the light source 6 are mounted on a surface of the substrate 7 on the vehicle lower side. Mounting the switching portion 3 (the push switch 31) and the light source 6 on the common substrate 7 allows the number of components and assembly man-hours to be reduced and also contributes to downsizing of the rear door open/close switch 1.

The push switch 31 is configured such that internal contacts are electrically connected when an end portion on the vehicle rear side is pressed toward the vehicle upper side. That is, the push switch 31 is pressed in a direction along the vehicle vertical direction (from the vehicle lower side toward the vehicle upper side).

The switch operating portion 23 of the arm 2 has a switch operating surface 23*a* which is parallel to the horizontal plane. When the arm 2 is located at the initial position, the switch operating surface 23*a* is in contact with an end portion (a lower surface) of the push switch 31 on the vehicle lower side or is located slightly below the lower surface. When the operator presses the press surface 21*a* of the operating portion 21 by the finger 100 (an arrow c in FIG. 2), the arm 2 rotationally moves about the rotational axis 2*a* to the switching position (an arrow d in FIG. 2), the switch operating portion 23 moves toward the vehicle upper side along with the rotational movement, and the switch operating surface 23*a* presses the end portion of the push switch 31 on the vehicle lower side toward the vehicle upper side (an arrow e in FIG. 2). As a result, a signal, which indicates that the internal contacts of the push switch 31 are electrically connected, is output to an external unlocking or locking device, and the rear door 10 is then opened or locked.

By rotationally moving about the rotational axis 2*a* as described above, the arm 2 serves to convert the pressing operation on the press surface 21*a* by the finger 100 (i.e., the pressing operation in a direction inclined toward the vehicle rear side relative to the vehicle vertical direction) into the pressing operation on the push switch 31 by the switch operating surface 23*a* (the pressing operation toward the vehicle upper side).

In general, an orientation of the substrate 7 optimizing the emission direction of the light source 6 is different from an orientation of the substrate 7 optimizing the push direction of the push switch 31, and it is thus difficult to mount the light source 6 and the push switch 31 on the common substrate 7. However, in the rear door open/close switch 1, the push direction is changed by using the arm 2. Therefore, even when the light source 6 and the push switch 31 are mounted on the common substrate 7 to reduce the size, both the emission direction of the light source 6 and the pressing operation direction to open/close the rear door 10 can be optimal.

Housing 5

The housing 5 houses and protects the arm 2, the push switch 31 as the switching portion 3, the spring member 4, the light source 6 and the substrate 7. The housing 5 has a box-shaped housing main body 51 having an opening on the vehicle lower side and a lid 52 covering the opening of the housing main body 51.

The housing main body 51 integrally has an upper wall 511 having a substantially rectangular shape in a plan view and provided on the vehicle upper side, a front wall 512 extending downward from an end portion of the upper wall 511 on the vehicle front side, a rear wall 513 extending downward from an end portion of the upper wall 511 on the vehicle rear side, and a pair of side walls (not shown) extending downward from both edges of the upper wall 511 in the vehicle width direction and coupling the front wall 512 to the rear wall 513. A protrusion 511*a* for positioning the arm 2 is integrally formed on the upper wall 511 of the housing main body 51. The protrusion 511*a* protrudes toward the vehicle lower side (toward the opening) and is inserted into the through-hole 24 of the arm 2. In addition, a mounting base portion 511*b* for fixing the substrate 7 is formed on the upper wall 511 located nearer to the vehicle rear side than the protrusion 511*a*.

The housing main body 51 also integrally has a flange 514 which extends upward from the end portion of the upper wall 511 on the vehicle front side. The flange 514 and the front wall 512 form a continuous plate and are arranged along an inner wall of the attachment hole 13*a* on the vehicle front side (along a sheet metal portion of the rear door 10). The flange 514 and the front wall 512 serve to hold the rear door open/close switch 1 in a desired position and orientation.

Since the rear door open/close switch 1 is configured such that the light source 6 is housed in the housing 5, at least a portion of the housing 5 is formed of a transparent member which transmits light from the light source 6. In this example, a portion of the lid 52 is formed of a transparent member which transmits light from the light source 6. The transparent member which can be used to form the lid 52 is, e.g., a transparent resin such as acrylic resin.

The lid 52 has a lid main body 521 formed of a transparent member and having an opening 52*a* at the center in the plan view, and an operating-portion cover 522 provided to cover the opening 52*a* of the lid main body 521 and allowing the operating portion 21 of the arm 2 to be pressed from the outside. A portion of the lid main body 521 facing the light source 6 serves as a plate-shaped outer lens portion 521*a*. On the other hand, a portion of the lid main body 521 located nearer to the vehicle front side than the opening 52*a* extends toward the vehicle upper side along the inner wall of the front wall 512, is curved at a top end toward the vehicle rear side and serves as an arm supporting portion 521*b* for supporting the axis portion 22 of the arm 2 from below. The operating-portion cover 522 is formed of a flexible member such as rubber, and the operating portion 21 can be pressed by pushing the operating-portion cover 522 with the finger 100. The lid main body 521 is weld-bonded to the housing main body 51 by ultrasonic welding.

Light Source 6

The light source 6 is to illuminate the license plate 12 attached to the license plate attaching portion 11, and constitutes the license plate lamp 60. The license plate lamp 60 is composed of the light source 6, the outer lens portion 521*a* of the lid main body 521, and an inner lens 8 provided between the light source 6 and the outer lens portion 521*a*. The inner lens 8 is a lens block for adjusting a path of light from the light source 6 and emitting the light toward the license plate 12, and is housed in the housing 5. The light emitted from the light source 6 is subjected to optical path adjustment in the inner lens 8, passes through the outer lens portion 521*a*, and travels toward the license plate 12, as indicated by an arrow a in FIG. 1. Alternatively, a lens may be integrally provided on the outer lens portion 521*a* without providing the inner lens 8.

In the rear door open/close switch 1, the light source 6 is arranged at a portion to be touched by an operator when opening/closing the rear door 10 (arranged on the door handle 13). Therefore, the light source 6 generates desirably a small amount of heat and is desirably a semiconductor light-emitting element. In this example, a light-emitting diode (LED) is used as the light source 6.

The light source 6 is mounted on the substrate 7 nearer to the vehicle rear side than the switching portion 3 (or the push switch 31). Since the light source 6 in this configuration is located at a distance from the license plate 12 to be illuminated, the light source 6 can illuminate a wide area of the license plate 12 and it is possible to reduce illumination unevenness on the license plate 12 and thereby possible to illuminate the license plate 12 with uniform brightness. In addition, when an operator puts his/her finger or hand under the door handle 13 to press the arm 2, the finger or hand is illuminated by the light source 6 and the operator thus can easily know the position of the rear door open/close switch 1. Furthermore, since the light source 6 is arranged nearer to the vehicle rear side than the switching portion 3, the door handle 13 has an appropriate thickness at a portion nearer to the vehicle rear side than the operating portion 21 and this facilitates gripping when opening/closing the rear door 10, resulting in that it is easy to open/close the rear door 10. Although only one light source 6 is shown in FIGS. 1 and 2, plural light sources 6 may be mounted on the substrate 7. When using plural light sources 6, it is desirable to arrange the plural light sources 6 in the vehicle width direction such that the size of the rear door open/close switch 1 in the vehicle longitudinal direction is not increased.

A connectorized cable extends out of the substrate 7 even though it is not shown in the drawings, and the push switch 31 and the light source 6 are connected to external devices (a power supply, an unlocking device and a locking device, etc.) via the connectorized cable. In this case, a connector may be provided for each connection destination.

Spring Member 4

The spring member 4 is to press the arm 2 in a rotational movement direction (indicated by a dashed arrow b in FIG. 2) from the switching position toward the initial position. The spring member 4 is formed of a rod-shaped or plate-shaped elastic member (a plate shape in this example) and is arranged such that one end portion thereof is locked to the housing 5. The rear door open/close switch 1 is configured such that when the arm 2 is rotationally moved from the initial position to the switching position, the spring member 4 receives a force from a portion of the arm 2 nearer to the vehicle front side than the rotational axis 2a, is elastically deformed by the force (and a reaction force at the locked portion), and presses the arm 2. The "portion of the arm 2 nearer to the vehicle front side than the rotational axis 2a" here is a portion of the arm 2 nearer to the vehicle front side than the rotational axis 2a when located at the initial position, and corresponds to a portion of the axis portion 22 in this example.

In the rear door open/close switch 1, a portion of the arm 2 in the vicinity of the rotational axis 2a is sandwiched between and supported by the housing main body 51 (the upper wall 511) and the lid 52 (the arm supporting portion 521b of the lid main body 521). Therefore, if, e.g., the spring member 4 is provided to receive a force from (or to interfere with) a portion of the arm 2 nearer to the vehicle rear side than the rotational axis 2a, a force to push down the axis portion 22 toward the vehicle lower side is generated when a pressing force is generated by pressing the operating portion 21, and a force to push downward is applied to the lid main body 521. In this case, a bonded portion (welded portion) between the housing main body 51 and the lid 52, or the lid main body 521 (the arm supporting portion 521b), is damaged during the repeated use, resulting in that waterproof properties may be impaired due to breakage or the lid 52 may come off of the housing main body 51.

By providing the spring member 4 so as to receive a force from (or to interfere with) a portion of the arm 2 nearer to the vehicle front side than the rotational axis 2a as is in the rear door open/close switch 1, a force to lift up is applied to the axis portion 22 of the arm 2 when a pressing force is generated by pressing the operating portion 21, and a load applied to the bonded portion (welded portion) or the arm supporting portion 521b is reduced. As a result, it is possible to prevent water ingress into the housing 5 due to breakage of the lid 52 or the bonded portion and to prevent the lid 52 from coming off of the housing main body 51, thereby preventing damage on the housing 5 for a long time.

The spring member 4 is integrally formed with the arm 2 such that the other end portion of the spring member 4 is coupled to a portion of the arm 2 nearer to the vehicle front side than the rotational axis 2a (in this example, a portion of the axis portion 22 nearer to the vehicle front side than the rotational axis 2a). This reduces the number of components and improves assemblability, as compared to when the arm 2 and the spring member 4 are separate components. However, it is not essential to integrally form the arm 2 and the spring member 4. For example, the arm 2 and the spring member 4 can be configured such that a protrusion protruding from the axis portion 22 of the arm 2 toward the vehicle front side comes into contact with the other end portion of the spring member 4 such as plate spring provided separately from the arm 2 when the arm 2 is rotationally moved.

The one end portion of the spring member 4 is desirably locked to the housing 5 (the housing main body 51) nearer to the vehicle front side than the rotational axis 2a. This is because if the one end portion of the spring member 4 is locked to the housing 5 nearer to the vehicle rear side than the rotational axis 2a, the spring member 4 may need to be curved or bent, which takes time and effort to process.

In the rear door open/close switch 1, the spring member 4 is formed to have a linear shape (plate shape) extending along the vehicle longitudinal direction in a state that the arm 2 is located at the initial position. A recess-shaped (slit-shaped) locking portion 512a for locking the one end portion of the spring member 4 is formed on the front wall 512 of the housing main body 51 and supports the spring member 4 by sandwiching the one end portion of the spring member 4 from above and below. When the arm 2 is rotationally moved from the initial position to the switching position, the spring member 4 is elastically deformed convex downward and generates a pressing force acting on the arm 2. The pressing force by the spring member 4 can be appropriately adjusted by changing the length (along the vehicle longitudinal direction), the thickness and the material, etc., of the spring member 4. In other words, it is possible to realize a desired operation load by appropriately adjusting the length, etc., of the spring member 4. The locking portion 512a of the housing main body 51 only needs to be able to restrict rotational movement of the spring member 4 (counterclockwise rotational movement in FIG. 2) by interfering with the one end portion of the spring member 4 when the arm 2 is rotationally moved from the initial position to the switching position, and for example, the locking portion 512a may be a protrusion or a level difference protruding from the front wall 512 toward the vehicle rear side. In other words, the locking portion 512a may be a portion which does not restrict rotational movement of the spring member 4 in a clockwise direction in FIG. 2.

Effects of the First Embodiment

As described above, the rear door open/close switch 1 in the first embodiment is provided with the arm 2 having the operating portion 21 to be pressed when opening/closing the door and rotationally moving about the rotational axis 2a from the initial position to the switching position when the operating portion 21 is pressed, and the spring member 4 for pressing the arm 2 in the rotational movement direction from the switching position to the initial position, wherein the arm 2 is arranged such that the rotational axis 2a is located nearer to the vehicle front side than the operating portion 21, the spring member 4 is formed of a rod-shaped or plate-shaped elastic member and is arranged such that one end portion thereof is locked to the housing 5, and when the arm 2 is rotationally moved from the initial position to the switching position, the other end portion of the spring member 4 receives a force from a portion of the arm 2 nearer to the vehicle front side (or vehicle front end) than the rotational axis 2a, and the spring member 4 is elastically deformed by the force and presses the arm 2.

By using the spring member 4, it is possible to obtain an appropriate operation load and clicking sensation even when a small push switch 31 is used as the switching portion 3, and it is thereby possible to realize both downsizing and an appropriate operation load. Furthermore, by providing the spring member 4 so as to receive a force from a portion of the arm 2 nearer to the vehicle front side (or vehicle front end) than the rotational axis 2a, it is possible to prevent a force from acting on the axis portion 22 in a direction to push down the lid 52. As a result, even when the license plate lamp 60 is integrated and a portion of the housing 5 is formed of a transparent member, it is possible to reduce a load applied to the bonded portion (welded portion), etc., and to prevent damage on the housing 5 for a long time, and thus to realize the long-life rear door open/close switch 1.

Second Embodiment

Next, the second embodiment will be described. The second embodiment is different from the first embodiment in the structure of the switching portion 3. The explanation for the same features as those in the first embodiment will be omitted.

FIGS. 4A and 4B are diagrams illustrating a rear door open/close switch 1a in the second embodiment of the invention, wherein FIG. 4A is a cross sectional view and FIG. 4B shows another cross section taken along the line A-A in FIG. 4A. FIGS. 5A and 5B are diagrams illustrating the rear door open/close switch 1a of FIG. 4 when the arm 2 is rotationally moved to the switching position, wherein FIG. 5A is a cross sectional view and FIG. 5B shows another cross section taken along the line B-B in FIG. 5A.

In the rear door open/close switch 1a, the switching portion 3 has two contacts 32 not rotationally moving with rotational movement of the arm 2, and a short-circuiting terminal 33 which comes into contact with the both contacts 32 to cause short-circuit therebetween when the arm 2 is moved to the switching position, and the short-circuiting terminal 33 is constructed from a spring terminal which elastically comes into contact with the two contacts 32.

In the second embodiment, the contacts 32 are formed of a metal pattern on the substrate 7. In other words, in the second embodiment, only a portion of the switching portion 3 is mounted on the substrate 7, and the short-circuiting terminal 33 which is the other portion of the switching portion 3 is provided on the arm 2. The short-circuiting terminal 33 is formed such that a center portion 33a is fixed to the switch operating surface 23a of the arm 2 and end portions 33b and 33c are curved toward the vehicle upper side and thus have a slight distance from the switch operating surface 23a.

When the operator presses the press surface 21a of the operating portion 21 by the finger 100 (an arrow f in FIG. 5A), the arm 2 rotationally moves about the rotational axis 2a to the switching position (an arrow g in FIG. 5A), the switch operating portion 23 moves toward the vehicle upper side along with the rotational movement, and the short-circuiting terminal 33 fixed to the switch operating surface 23a moves toward the vehicle upper side and comes into contact with the both contacts 32 (an arrow h in FIG. 5A and an arrow i in FIG. 5B). At this time, the both end portions 33b and 33c of the short-circuiting terminal 33 respectively come into contact with the two contacts 32 while elastically deforming, and the both contacts 32 are short-circuited (electrically conducted) via the short-circuiting terminal 33. In the rear door open/close switch 1a, a contact signal indicating occurrence of short circuit between the two contacts 32 is output to an external unlocking or locking device and the rear door 10 is opened or locked.

In the rear door open/close switch 1a of the second embodiment, a spring terminal is used as the short-circuiting terminal 33. Therefore, even when the short-circuiting terminal 33 becomes tilted relative to the both contacts 32 due to rotational movement of the arm 2, the short-circuiting terminal 33 can elastically come into contact with the both contacts 32 and can reliably cause short circuit between the contacts 32. In addition, since it is not necessary to use an off-the-shelf push switch 31, it is possible to reduce the cost.

Although the contacts 32 are a metal pattern formed on the substrate 7 in this example, it is not limited thereto. The contacts 32 may be metal members such as metal plates formed separately from the substrate 7. In this case, the short-circuiting terminal 33 may be formed of a non-elastically deformable metal plate or metal pattern (metal foil) while forming the contacts 32 as spring contacts which elastically come into contact with the short-circuiting terminal 33.

Although the embodiments and Examples of the invention have been described, the invention is not intended to be limited to the embodiments and Examples, and the various kinds of modifications can be implemented without departing from the gist of the invention.

The invention claimed is:

1. A rear door open/close switch for being installed in a rear door of a vehicle to open or close the rear door, comprising:
    an arm that comprises an operating portion to be pressed when opening or closing the door and rotationally moves about a rotational axis from an initial position to a switching position when the operating portion is pressed;
    a switching portion that outputs a signal to open or lock the rear door when the arm is rotationally moved to the switching position;
    a spring member for pressing the arm in a rotational movement direction from the switching position toward the initial position; and
    a housing that houses the arm, the switching portion and the spring member and comprises an operating-portion cover allowing the operating portion to be pressed from the outside,
    wherein the arm is arranged such that the rotational axis thereof is located nearer to a vehicle front side than the operating portion,
    wherein the spring member comprises a rod-shaped or plate-shaped elastic member and is arranged such that one end portion thereof is locked to the housing, and
    wherein when the arm is rotationally moved from the initial position to the switching position, another end portion of the spring member receives a force from a portion of the arm located nearer to the vehicle front side than the rotational axis and the spring member is elastically deformed by the force and thereby presses the arm.

2. The rear door open/close switch according to claim 1, wherein the spring member is integrally formed with the arm in such a manner that the other end of the spring member is coupled to the portion of the arm nearer to the vehicle front side than the rotational axis.

3. The rear door open/close switch according to claim 2, wherein the spring member extends along a vehicle longitudinal direction in a state that the arm is located at the initial position.

4. The rear door open/close switch according to claim 1, wherein the switch is configured to be attached to a door handle provided above a license plate attaching portion of the rear door, wherein the switch further comprises:

a light source for illuminating a license plate attached to the license plate attaching portion; and a substrate that is housed in the housing and mounts the light source and at least a portion of the switching portion, and wherein at least a portion of the housing comprises a transparent member transmitting light from the light source.

5. The rear door open/close switch according to claim 4, wherein the light source is mounted on the substrate nearer to a vehicle rear side than the switching portion.

6. The rear door open/close switch according to claim 1, wherein the switching portion comprises two contacts not rotationally moving with rotational movement of the arm and a short-circuiting terminal that is provided on the arm and comes into contact with the both contacts to cause short-circuit therebetween when the arm is moved to the switching position, and wherein the short-circuiting terminal comprises a spring terminal elastically coming into contact with the two contacts.

* * * * *